United States Patent
Clossen-von Lanken Schulz et al.

(10) Patent No.: US 11,360,052 B2
(45) Date of Patent: Jun. 14, 2022

(54) TESTING OF SLOT BREECH WEDGES OF A GENERATOR ROTOR

(71) Applicant: Siemens Energy Global GmbH & Co. KG, Munich (DE)

(72) Inventors: Michael Clossen-von Lanken Schulz, Issum (DE); Paul Dreischer, Bochum (DE); Stefan Obermayr, Duisburg (DE)

(73) Assignee: SIEMENS ENERGY GLOBAL GMBH & CO. KG, Munich (DE)

( * ) Notice: Subject to any disclaimer, the term of this patent is extended or adjusted under 35 U.S.C. 154(b) by 132 days.

(21) Appl. No.: 16/761,690

(22) PCT Filed: Oct. 12, 2018

(86) PCT No.: PCT/EP2018/077830
§ 371 (c)(1),
(2) Date: May 5, 2020

(87) PCT Pub. No.: WO2019/096504
PCT Pub. Date: May 23, 2019

(65) Prior Publication Data
US 2021/0181154 A1  Jun. 17, 2021

(30) Foreign Application Priority Data
Nov. 14, 2017  (DE) .................... 10 2017 220 274.2

(51) Int. Cl.
*G01N 29/04* (2006.01)
*G01N 29/22* (2006.01)
(Continued)

(52) U.S. Cl.
CPC ......... *G01N 29/043* (2013.01); *G01N 29/046* (2013.01); *G01N 29/225* (2013.01);
(Continued)

(58) Field of Classification Search
CPC ...... G01N 29/04; G01N 29/28; G01N 29/043; G01N 29/265; G01N 29/225;
(Continued)

(56) References Cited

U.S. PATENT DOCUMENTS 2,751,783 A * 6/1956 Erdman ................. G10K 11/02
73/634
3,154,897 A * 11/1964 Howard ................. B24D 11/06
451/531
(Continued)

FOREIGN PATENT DOCUMENTS

| CH | 703662 A1 | 2/2012 |
| DE | 102016226161 A1 | 8/2017 |

OTHER PUBLICATIONS

PCT International Search Report and Written Opinion of International Searching Authority dated Jan. 11, 2019 corresponding to PCT International Application No. PCT/EP2018/077830 filed Oct. 12, 2018.

*Primary Examiner* — Jacques M Saint Surin (57) ABSTRACT

A test robot for testing slot breech wedges, which are provided on the outer periphery of a rotor of a generator, the rotor being surrounded by a stator, with a chassis, which receives a drive system, a position detection device, a controller, which controls the drive system based on data captured by the position detection device, magnets attached to the chassis, which are positioned and designed such that the magnets adherently hold the chassis to a magnetic substrate, at least one ultrasound test head, which is freely accessible from the underside of the chassis and is movable upward and downward, and at least one couplant application component, which is provided on the chassis and is associated with the ultrasound test head.

14 Claims, 6 Drawing Sheets

(51) Int. Cl.
*G01N 29/28* (2006.01)
*B33Y 80/00* (2015.01)

(52) U.S. Cl.
CPC .............. *G01N 29/28* (2013.01); *B33Y 80/00* (2014.12); *G01N 2291/0289* (2013.01); *G01N 2291/2693* (2013.01)

(58) Field of Classification Search
CPC ......... G01N 29/046; G01N 2291/2693; G01N 2291/0289; B33Y 80/00
USPC .......................................................... 73/584
See application file for complete search history.

(56) References Cited

U.S. PATENT DOCUMENTS

| | | | | |
|---|---|---|---|---|
| 3,894,253 A * | 7/1975 | Willyoung | ............... | H02K 9/00 310/61 |
| 5,012,684 A * | 5/1991 | Humphries | ............... | G01B 7/14 324/207.18 |
| 5,557,216 A | 9/1996 | Dailey et al. | | |
| 5,619,423 A * | 4/1997 | Scrantz | ............. | G01N 29/2412 324/220 |
| 5,888,129 A * | 3/1999 | Neff | .......... | B24D 7/14 451/541 |
| 6,220,099 B1 * | 4/2001 | Marti | ................... | G01N 27/902 73/633 |
| 6,943,470 B2 * | 9/2005 | Rowe | ....................... | H02K 9/12 310/58 |
| 7,201,055 B1 | 4/2007 | Bagley et al. | | |
| 7,743,675 B2 * | 6/2010 | Moore | .................... | G01M 7/08 73/865.8 |
| 8,590,383 B2 * | 11/2013 | Brignac | ............. | G01N 29/2462 73/640 |
| 9,057,667 B2 * | 6/2015 | Perrone | .................. | A62B 3/005 |
| 10,197,538 B2 * | 2/2019 | Alford | .................... | G01N 27/90 |
| 2011/0175641 A1 | 7/2011 | Wiesendanger et al. | | |
| 2013/0282174 A1 | 10/2013 | Xi et al. | | |
| 2017/0219422 A1 * | 8/2017 | Hamano | .............. | G01N 29/265 |
| 2017/0219533 A1 | 8/2017 | Alford et al. | | |
| 2017/0299554 A1 * | 10/2017 | Bondurant | ............. | B06B 1/045 |
| 2018/0313725 A1 * | 11/2018 | Harada | .................. | G01M 13/00 |
| 2021/0172912 A1 * | 6/2021 | Maggio | ................ | G01N 29/225 |

\* cited by examiner

TESTING OF SLOT BREECH WEDGES OF A GENERATOR ROTOR

CROSS REFERENCE TO RELATED APPLICATIONS

This application is the US National Stage of International Application No. PCT/EP2018/077830 filed 12 Oct. 2018, and claims the benefit thereof. The International Application claims the benefit of German Application No. DE 10 2017 220 274.2 filed 14 Nov. 2017. All of the applications are incorporated by reference herein in their entirety.

FIELD OF INVENTION

The present invention relates to the testing of slot wedges which are provided on the outer circumference of a rotor of a generator, which rotor is surrounded by a stator.

BACKGROUND OF INVENTION

Slot wedges are used to keep the copper windings arranged on the rotor of a generator in place. For this purpose, they are known to be used between the rotor teeth of the rotor body. During operation of the generator, the slot wedges may be damaged. In particular, cracks form starting from the edges of the slot wedges since the highest forces act there. If such defects are not eliminated in good time, this can result in the destruction of the generator. Accordingly, the checking of slot wedges is part of the routine review of power plants in order to find damage as early and as completely as possible.

In order to test slot wedges, the entire rotor of the generator is normally removed from the stator and clamped in a bearing provided for review purposes. The slot wedges are then tested using an ultrasonic test head. Only after the test has been completed and after evaluation of the test results, including the assessment and possibly required repair work, can the generator be assembled again and activated. As a result of the disassembly and reassembly of the rotor, very long downtimes which entail high costs result even if there are no findings for the slot wedges.

SUMMARY OF INVENTION

On the basis of this prior art, it is an object of the present invention to reduce the downtimes when testing slot wedges.

In order to achieve this object, the present invention provides a test robot for testing slot wedges which are provided on the outer circumference of a rotor of a generator, which rotor is surrounded by a stator, comprising a chassis which accommodates a drive system, a position capture device, a controller which controls the drive system on the basis of data captured by the position capture device, magnets which are fitted to the chassis and are positioned and designed in such a manner that they keep the chassis adhering to a magnetic substrate, at least one ultrasonic test head which is arranged on the chassis, is freely accessible from the underside of the chassis and can be moved up and down, and at least one couplant application device which is provided on the chassis and is assigned to the ultrasonic test head. With suitably selected external dimensions, such a test robot can be inserted into the annular gap present between the rotor and the stator of a generator and can then be moved along the slot wedges in order to carry out the test using the at least one ultrasonic test head. Accordingly, it is not necessary to remove the rotor from the stator in order to carry out the test, which entails a great time saving at least if there are no findings. In order to control the movement of the test robot inside the annular gap, the test robot is provided with a position capture device which captures current actual position data, compares the latter with stored desired position data and controls the drive system on the basis of the actual/desired comparison. In this case, the magnets fitted to the chassis ensure good adhesion of the chassis to the rotor. The strength and number of magnets is advantageously selected in this case in such a manner that they bear the dead weight of the test robot, with the result that the latter can be moved without any problems along the entire circumference of the rotor. The couplant application device is used to ensure the application of a sufficient amount of couplant in order to be able to ensure the proper testing of the slot wedges using the at least one ultrasonic test head. The ultrasonic test head can be moved up and down, with the result that it can be placed onto the rotor or onto the couplant covering the latter in the downward direction in order to carry out a test.

The chassis is advantageously additively produced from a photopolymer. The dimensions of the chassis can therefore be easily adapted on a computer to the available gap dimension of the annular gap of a generator present between the rotor having the slot wedges to be tested and the stator, and the chassis can be produced in a short time. After the other components have been assembled on the chassis, which takes only little time, a test robot which is optimally adapted to the external requirements is then ready for use.

According to one embodiment of the present invention, the drive system has three or four wheels rotatably held on the chassis, wherein each wheel can be driven in a rotational manner via a stepping motor and can be steered via a servomotor. The movement of the test robot can therefore be controlled very precisely.

The wheels are advantageously coated with a coarse abrasive in order to increase the friction during the rolling of the wheels on the rotor and to accordingly optimize the propulsion of the test robot. Studies have revealed that the best results can be achieved with abrasive in comparison with other materials, for example rubber or the like.

Neodymium magnets are advantageously used as magnets. It has been found that, with a suitable choice of the positions and the number of individual neodymium magnets, which is dependent on the dead weight of the test robot, the test robot can be reliably moved on the rotor even upside down.

According to one configuration of the present invention, the position capture device has at least two downwardly directed cameras which are arranged on the chassis and lights for illuminating the camera images. The cameras are advantageously used to determine the position of the test robot based on the joins between the slot wedges and the rotor body, with the result that the drive can be controlled in the manner of a line follower along a groove using software.

The at least one ultrasonic test head is advantageously arranged orthogonally with respect to its testing direction on the chassis and is provided with an approach wedge which orthogonally deflects the ultrasonic waves emitted by the ultrasonic test head and is advantageously produced from Plexiglas. This makes it possible to reduce the overall height of the test robot, which may be essential for using the test robot in annular gaps of a small gap dimension.

According to one configuration of the test robot according to the invention, the at least one ultrasonic test head can be moved up and down via at least one servomotor, in particular via two servomotors, which results in a very precise and reliable functionality.

A pump and a couplant reservoir connected to the at least one couplant application device via a couplant line are advantageously provided at a distance from the test robot and may be arranged in a common housing.

In order to achieve the object mentioned at the outset, the present invention also provides a method for testing slot wedges which are provided on the outer circumference of a rotor of a generator, which rotor is surrounded by a stator, using a test robot of the type according to the invention which is inserted into an annular gap present between the rotor and the stator.

The position capture device advantageously captures at least one actual orientation of the test robot with respect to a join present between a slot wedge and a rotor body, the controller compares the captured actual orientation with a stored desired orientation and controls the drive system on the basis of the actual/desired comparison, in particular the pivot position of the wheels. This ensures a reliable movement of the test robot along a slot wedge to be tested.

BRIEF DESCRIPTION OF THE DRAWINGS

Further features and advantages of the present invention become clear on the basis of the following description of a test robot according to one embodiment of the present invention with reference to the accompanying drawing, in which.

DETAILED DESCRIPTION OF INVENTION

Figure 1:
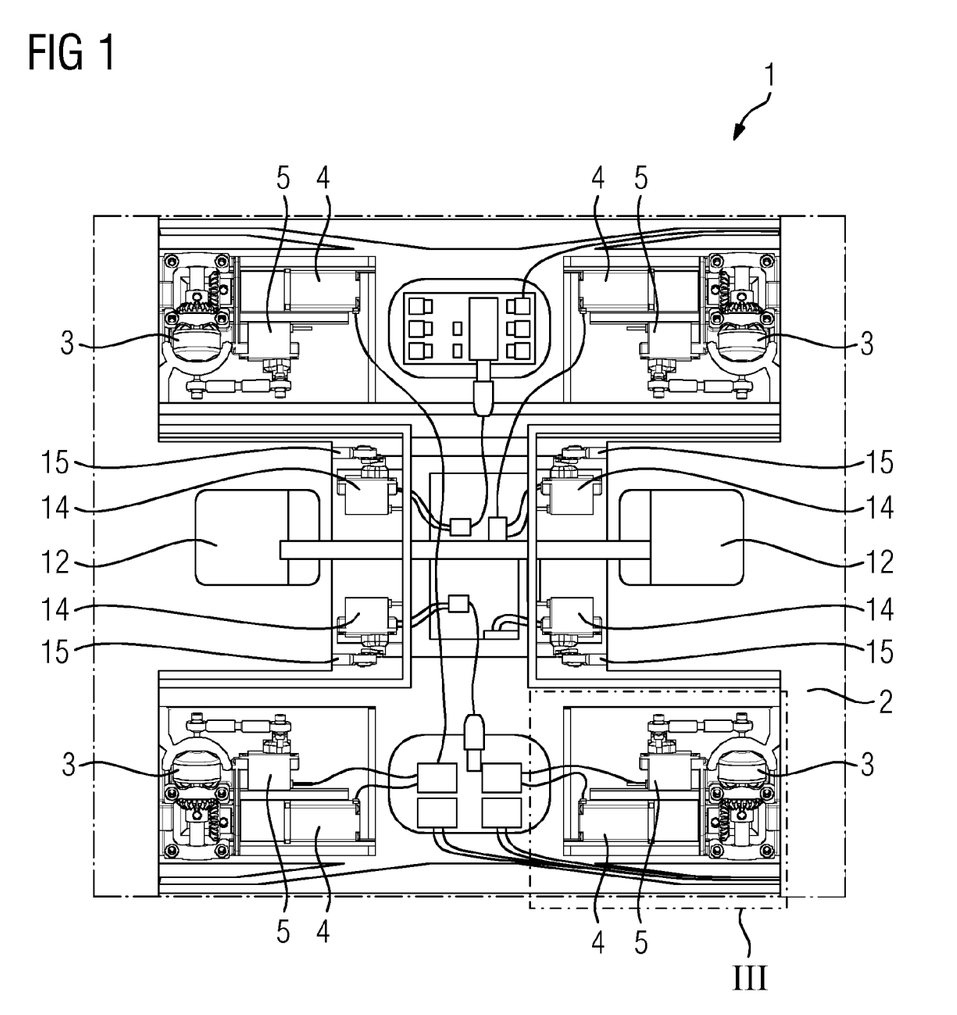
FIG. 1 shows a schematic plan view of a test robot according to one embodiment of the present invention which is illustrated without a cover in order to be able to better illustrate the individual components of the test robot.
Figure 2:
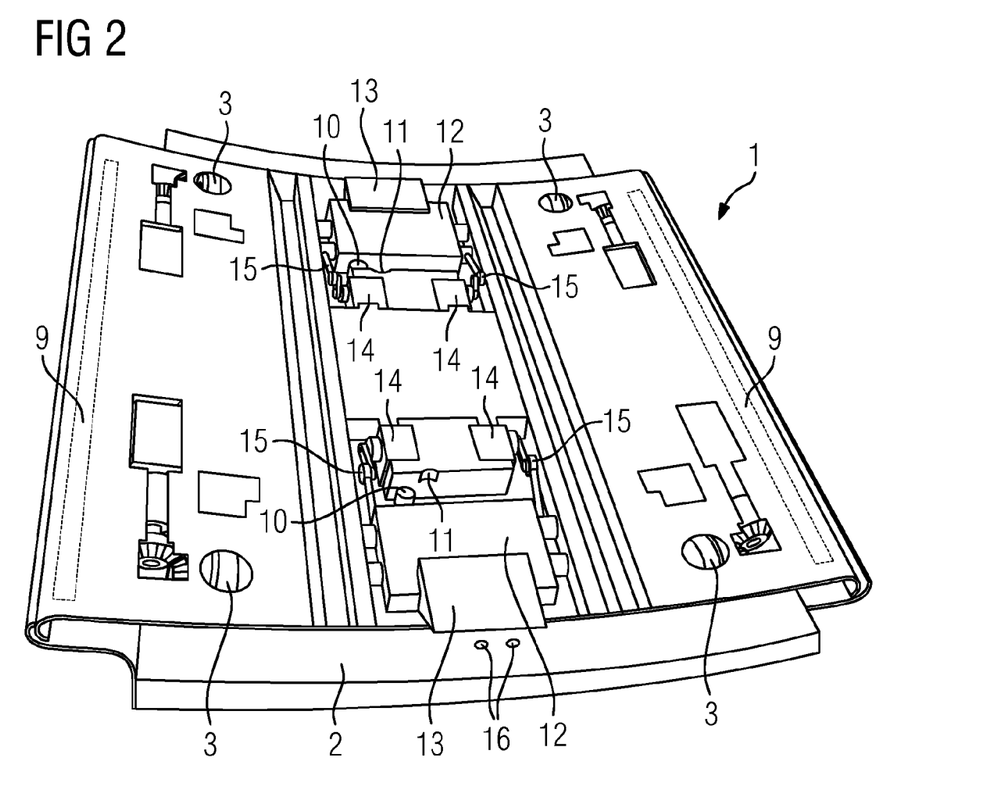
FIG. 2 shows a view from below of the test robot illustrated in FIG. 1.
Figure 3:
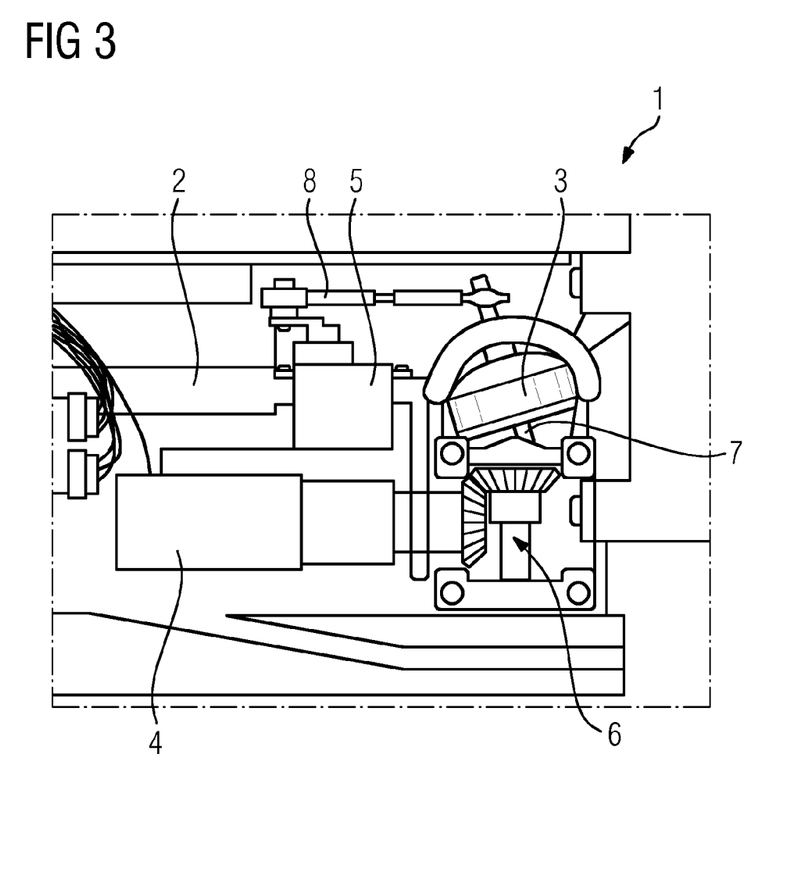
FIG. 3 shows an enlarged view of the section provided with the reference sign III in FIG. 1, in which case the illustrated wheel is in a deflected position.

FIGS. 1 to 5 show a test robot 1 according to one embodiment of the present invention and components thereof. The test robot 1 comprises a chassis 2 which, in the present case, was additively produced from a photopolymer on the basis of CAD data. The chassis 2 accommodates a drive system which has four wheels 3 which are rotatably held on the chassis 2, can each be driven in a rotational manner via a stepping motor 4 and can be steered via a servomotor 5, as shown in FIG. 3. The stepping motors 4 are mounted orthogonally with respect to the direction of rotation of the wheels 3 and drive the latter by means of bevel gears 6. All wheels 3 are rotatably mounted and are connected to the associated axis of rotation 7 via cardan joints which are not illustrated in any more detail. A crank arm system 8 acts on the free end of each axis of rotation 7 and is connected to the associated servomotor 5, with the result that the wheels 3 can be steered via the associated servomotor 5. The wheels 3 themselves are coated with a coarse abrasive on their running surfaces in order to improve the adhesion. Magnets, neodymium magnets in the present case, which are not illustrated in any more detail are also fitted to the chassis 2 in the regions indicated with the reference numeral 9, the number and position of said magnets being selected in such a manner that they can keep the test robot adhering to a magnetic substrate.

Figure 5:
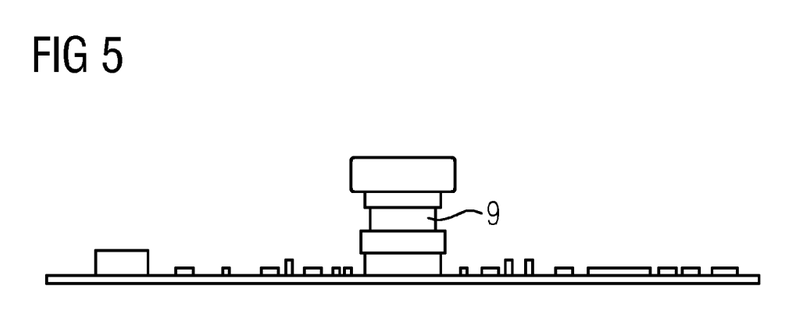
FIG. 5 shows a side view of a camera of the test robot illustrated in FIG. 1, which camera forms part of a position capture device.

The test robot 1 also comprises a position capture device which is accommodated on the chassis 2 and, in the present case, has two downwardly directed cameras 10 according to FIG. 5 which are arranged on the chassis 2 and lights 11 for illuminating the camera images.

Figure 4:
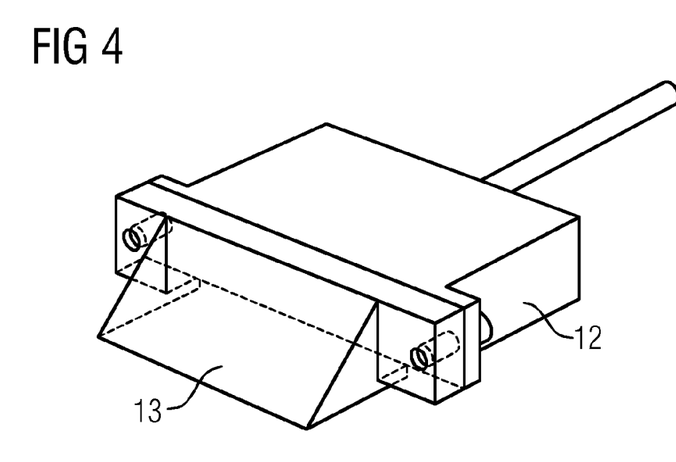
FIG. 4 shows a schematic illustration of an ultrasonic test head of the test robot illustrated in FIG. 1.

In addition, as shown in FIG. 2 in particular, two ultrasonic test heads 12, which in the present case each operate at a sound frequency of 2 MHz, are arranged orthogonally with respect to their testing direction at a distance from one another in the central region of the underside of the chassis 2 and are each provided with an approach wedge 13 which orthogonally deflects the ultrasonic waves emitted by the ultrasonic test head 12, see FIG. 4. Each of the ultrasonic test heads 12 can be moved up and down via two servomotors 14, which is implemented in the present case using appropriately designed crank arm systems 15 which connect the servomotors 14 to the associated ultrasonic test head 12. Each ultrasonic test head 12 is assigned a couplant application device 16 which can be used to apply electrically non-conductive couplant needed to carry out an ultrasonic measurement to an object to be tested. A couplant reservoir 18, which can be connected to the respective couplant application devices 16 via couplant lines, and a pump 19, which can be used to convey the couplant contained in the couplant reservoir 18 to the couplant application devices 16, are provided in a separate housing 17.

Figure 6:
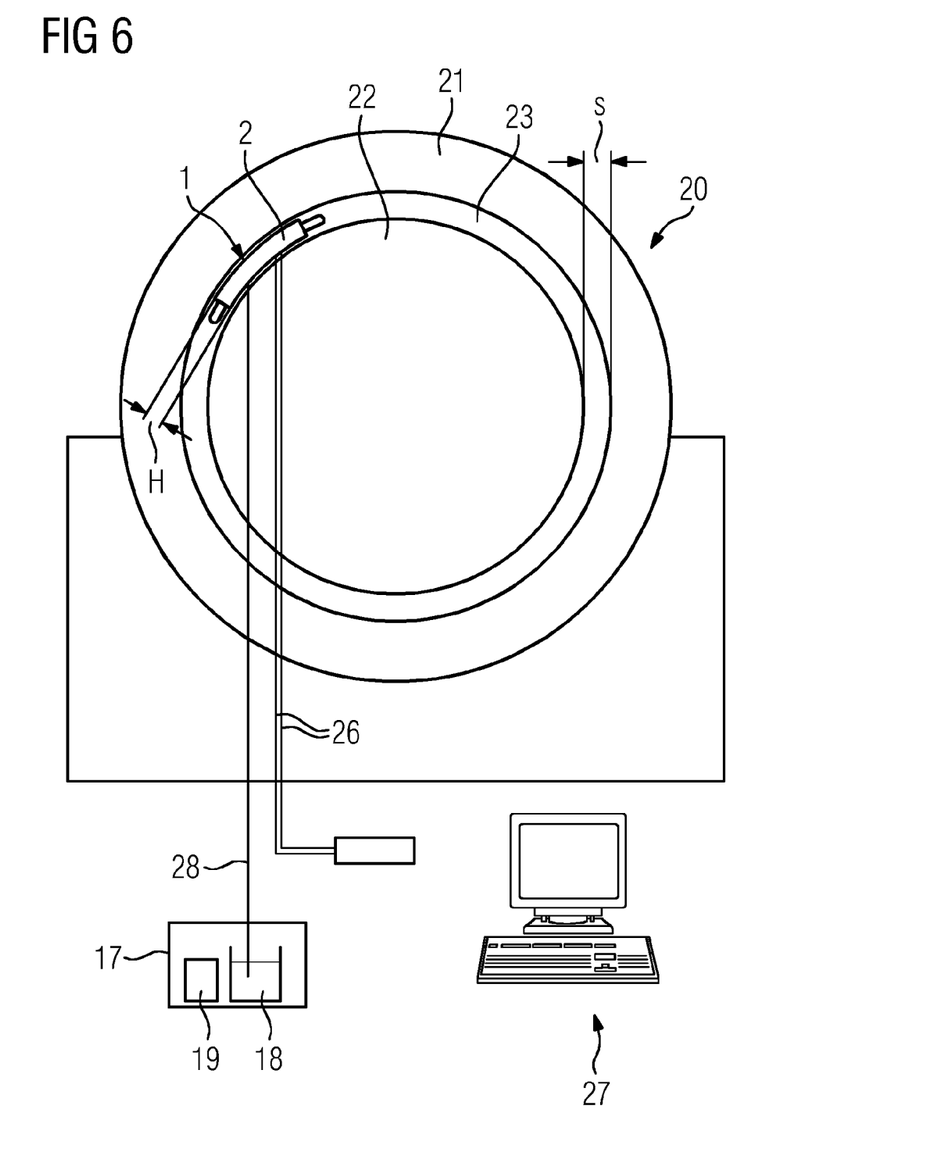
FIG. 6 shows a schematic illustration of the test robot while testing slot wedges of a generator.
Figure 7:
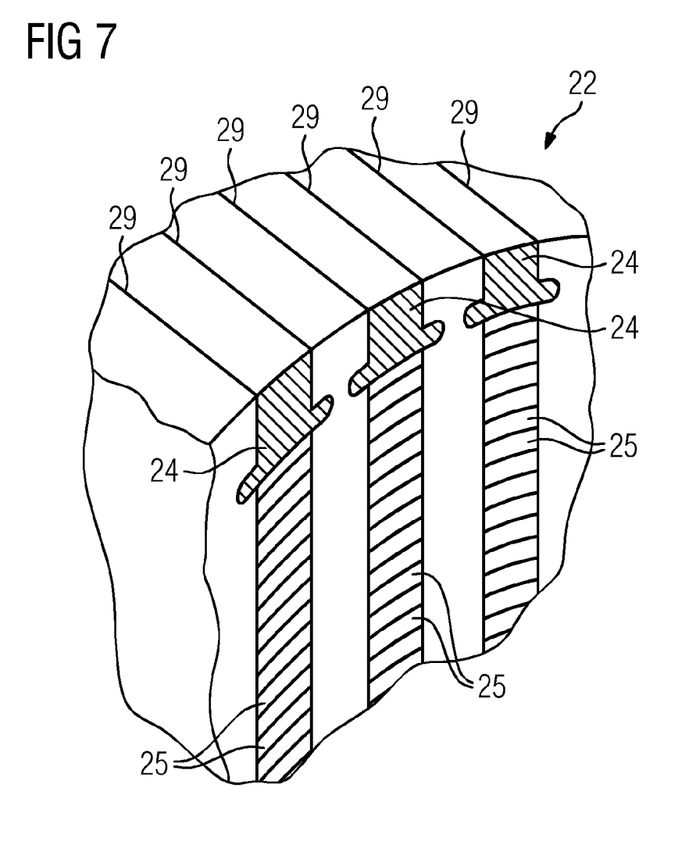
FIG. 7 shows a sectioned partial view of the rotor of the generator illustrated in FIG. 6.

FIGS. 6 and 7 show a generator 20 having a stator 21 and a rotor 22 which are separated from one another by an annular gap 23. A multiplicity of slot wedges 24 are provided on the outer circumference of the rotor 22 and are used to keep the copper windings or copper wires 25 arranged on the rotor 22 in place.

In order to test the slot wedges 24 of the rotor 22, the test robot 1 is connected, in a first step via suitable cables 26, to a controller 27 which in the present case is a conventional computer with suitable software. The couplant application devices 16 of the test robot 1 are also connected to the couplant reservoir 18 via couplant lines 28. The test robot 1 is then inserted into the annular gap 23 present between the stator 21 and the rotor 22 in such a manner that the underside of the chassis 2 points in the direction of the rotor 22. The external dimensions of the test robot 1 or of the chassis 2 are adapted in this case to the gap dimension of the annular gap 23. In other words, the height H of the test robot 1 is selected to be somewhat shorter than the gap dimension s of the annular gap 23. In addition, the chassis 2 is bent in a manner corresponding to the radius of the annular gap 23, as can be seen in FIG. 6, in particular. In a further step, ultrasonic measurements can be carried out using the ultrasonic test heads 12, while the test robot 1 is moved across the rotor 22 of the generator 20. For this purpose, a suitable amount of couplant 16 is applied to the surface of the rotor 22 via the couplant application devices 16, whereupon the ultrasonic test heads 12 are moved in the direction of the rotor 22 using the servomotors 14 and are placed onto the surface of the rotor or onto the couplant. The data captured by the ultrasonic test heads 12 are transmitted to the controller 27 and are processed further there in a known manner, in particular are also visually reproduced. In order to be able to move the test robot 1 in a straight line along a slot wedge 24 to be checked, the position capture device uses the joins 29 present between a slot wedge 24 and the rotor body in the present case. More precisely, the cameras 10 capture actual orientations of the test robot 1 with respect to one of the joins 29, whereupon the controller 27 compares the captured actual orientations with stored desired orientations and controls the drive system on the basis of the actual/desired comparison, more precisely the servomotors 5, in order to cause a desired deflection of the individual wheels 3. The path to be covered by the test robot 1 therefore corresponds to the course of the corresponding join 29. Since the join 29 is recorded and evaluated using both cameras 10 which are each assigned to an axis of the test robot 1, an orientation with respect to the join 29 can take place. For this purpose, a comparison image of the join is recorded in advance in the present case for system calibration. A considerable contrast between the illuminated region and the join shadow, which can be represented as a line, is produced by the shadow cast by the lights 11. An image recorded by the cameras 10 represents here a two-dimensional array containing values, on the basis of which the position of the join 29 relative to the overall image can be determined with the aid of known image processing methods. In this case, various edge detection algorithms, which can be implemented and tested for example using Microsoft Visual Studio 2017 and the expansion EmguCV in C#, are possible. It has been found that the use of a cross-correlation algorithm in combination with the use of a threshold value provides the best results. The position of the join 29 in the camera image can be determined by comparing the camera image with the previously recorded comparison image, thus making it possible to control the trajectory to be traveled by the test robot 1. In this case, the control variable is the deflection angle of the four wheels 3. This is proportional control which is based on the "Firmata" library. This can be incorporated into Visual Studio 2017 and in this case undertakes the serial communication and the management of all digital inputs and outputs of the Arduino boards which were used in the present case for the stepping motors 4 and the servomotors 5. The actual image processing and control algorithms can then be programmed in C#, access the Firmata library and implement all functions in combination with the installed power electronics. The control aggressiveness can be adaptively adjusted by the operator with the aid of a shift register. The implementation of all other travel parameters, for example the speed of the test robot 1, involves control processes. The software of the controller 27 has corresponding modes for this purpose.

The use of the test robot 1 according to the invention is advantageous, in particular, in that the slot wedges 24 can be tested for possible damage without having to remove the rotor 22 from the stator 21 for this purpose. This makes it possible to save a very large amount of time, at least if there are no findings for the slot wedges 24, which entails short downtimes of the generator 20 and therefore low costs. The position capture device and the drive system guarantee safe guidance of the test robot 1 along the slot wedges 24 to be tested in this case.

Although the invention has been described and illustrated more specifically in detail by means of the preferred exemplary embodiment, the invention is not restricted by the disclosed example and other variations can be derived therefrom by a person skilled in the art without departing from the scope of protection of the invention.

The invention claimed is:

1. A test robot for testing slot wedges which are provided on an outer circumference of a rotor of a generator, which rotor is surrounded by a stator, comprising:
   a chassis which accommodates a drive system,
   a position capture device,
   a controller which controls the drive system on the basis of data captured by the position capture device,
   magnets which are fitted to the chassis and are positioned and designed in such a manner that they keep the chassis adhering to a magnetic substrate,
   at least one ultrasonic test head which is arranged on the chassis, is freely accessible from an underside of the chassis and is moveable up and down, and
   at least one couplant application device which is provided on the chassis and is assigned to the ultrasonic test head;
   wherein the drive system has a plurality of wheels rotatably held on the chassis, the wheels being drivable and steerable, for each of the wheels the drive system comprises
   a stepping motor that drives the respective wheel rotationally, and
   a servomotor that steers the respective wheel.

2. The test robot as claimed in claim 1,
   wherein the chassis is additively produced from a photopolymer.

3. The test robot as claimed in claim 1,
   wherein the plurality of wheels is three or four wheels.

4. The test robot as claimed in claim 3,
   wherein the wheels are coated with a coarse abrasive.

5. The test robot as claimed in claim 1,
   wherein the magnets are neodymium magnets.

6. The test robot as claimed in claim 1,
   wherein the position capture device has at least two downwardly directed cameras which are arranged on the chassis and lights for illuminating camera images.

7. The test robot as claimed in claim 1,
   wherein the at least one ultrasonic test head is arranged orthogonally with respect to its testing direction on the chassis and is provided with an approach wedge which orthogonally deflects ultrasonic waves emitted by the ultrasonic test head.

8. The test robot as claimed in claim 1,
   wherein the at least one ultrasonic test head is moveable up and down via at least one servomotor.

9. The test robot as claimed in claim 1, further comprising:
   a pump and a couplant reservoir which are connected to the at least one couplant application device via a couplant line at a distance from the test robot.

10. The test robot as claimed in claim 9,
    wherein the pump and the couplant reservoir are arranged in a common housing.

11. A method for testing slot wedges which are provided on an outer circumference of a rotor of a generator, which rotor is surrounded by a stator, the method comprising:
    using a test robot as claimed in claim 1;
    inserting the test robot into an annular gap present between the rotor and the stator.

12. A method for testing slot wedges which are provided on an outer circumference of a rotor of a generator, which rotor is surrounded by a stator, the method comprising
    using a test robot as claimed in claim 1;
    inserting the test robot into an annular gap present between the rotor and the stator, wherein the position capture device captures at least one actual orientation of the test robot with respect to a join present between a slot wedge and a rotor body, and wherein the controller compares the captured actual orientation with a stored desired orientation and controls the drive system on the basis of the comparison.

13. The test robot as claimed in claim 8, wherein the at least one ultrasonic test head is moveable up and down via two servomotors.

14. The test robot as claimed in claim 1, wherein the plurality of wheels are configured to contact the rotor.

* * * * *